July 10, 1951 — A. W. KEMP — 2,560,451
LUBRICANT CONTROL FOR JOURNAL BOXES OR THE LIKE
Filed April 15, 1949 — 2 Sheets-Sheet 1

Inventor
Archer W. Kemp
By
Rockwell & Bartholow
ATTORNEYS

July 10, 1951 A. W. KEMP 2,560,451
LUBRICANT CONTROL FOR JOURNAL BOXES OR THE LIKE
Filed April 15, 1949 2 Sheets-Sheet 2
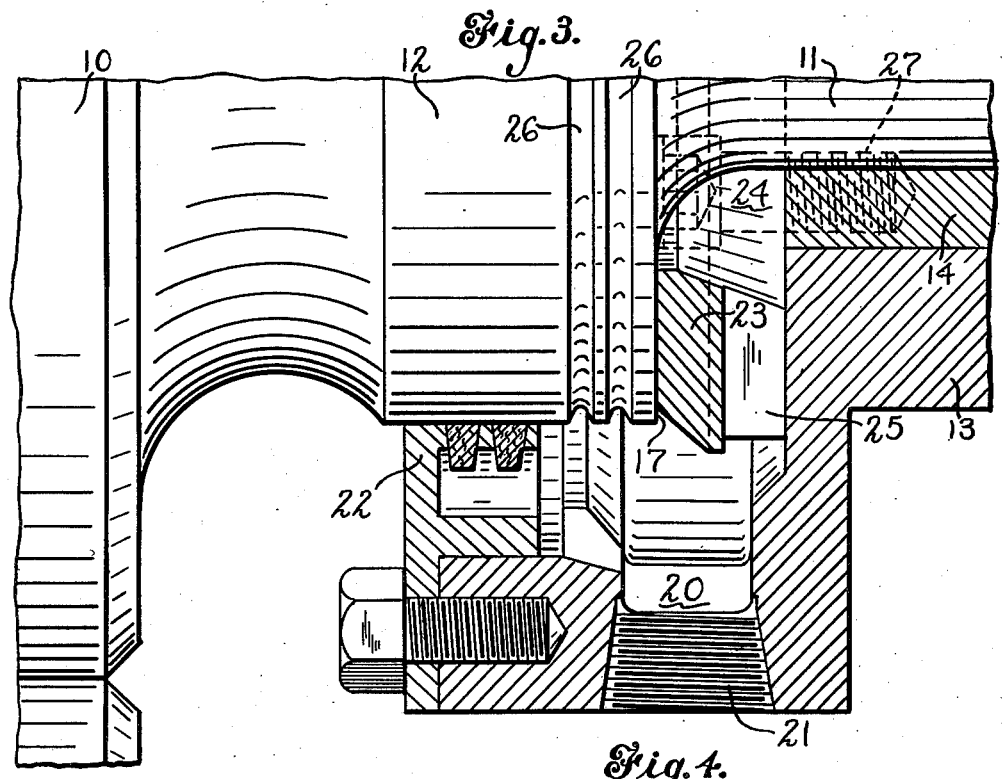
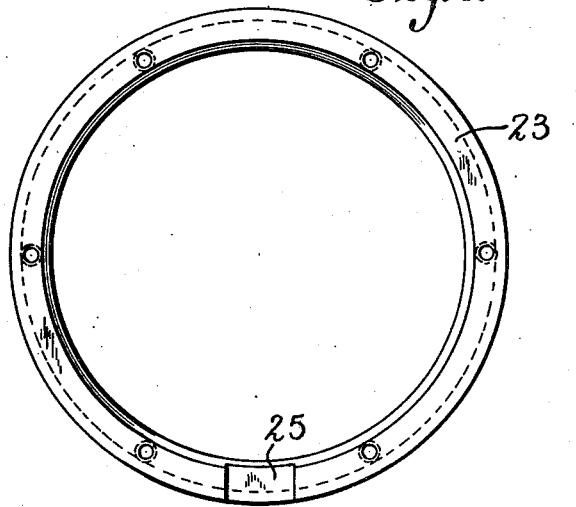
Inventor
Arthur W. Kemp
By
Rockwell & Nicholson
ATTORNEYS Patented July 10, 1951

2,560,451

UNITED STATES PATENT OFFICE 2,560,451

LUBRICANT CONTROL FOR JOURNAL BOXES OR THE LIKE

Arthur W. Kemp, Woodbridge, Conn., assignor to Farrel-Birmingham Company, Incorporated, Ansonia, Conn., a corporation of Connecticut Application April 15, 1949, Serial No. 87,605

3 Claims. (Cl. 308—121)

This invention relates to the draining of lubricating oil from bearings of the rolls employed in mills and calenders used for rubber, plastics, linoleum or similar materials, and more particularly to means for preventing the lubricating oil which is supplied to the roll necks or journals from leaking past the sealing ring usually provided, and interfering with the operation of the mill or calender.

The journals of the rolls in devices of the character referred to above are usually subjected to flood lubrication, in that a considerable supply of oil is conducted to the roll necks or the journals of the rolls, and the excess of oil is allowed to drain off and is used again. A sealing ring of some character usually surrounds the shoulder of the roll or a portion of the roll adjacent the neck, to prevent the lubricant following the roll surface, and to turn it back where it may be collected for reuse. However, as a large part of the excess oil tends to travel along the roll shoulder, it has been found difficult to prevent it leaking by the seal, and a leaky bearing is the result.

In prior installations a bushing or liner is provided in the journal box, this liner usually being provided with an annular flange which abuts the roll shoulder, and the oil usually drains out between this flange and the roll shoulder, following the latter down to the seal. I contemplate in the present invention to provide for the draining of the oil from the bearing before it comes in contact with the revolving roll shoulder, and hence before it reaches the oil seal. With such a construction a relatively small amount of the lubricating oil reaches the seal, so that the latter has much less work to do, and can therefore retain what oil does comes into contact with it so that none will leak past the seal.

One object of the present invention is to provide new and improved means for draining the oil from the roll bearings of a mill calender.

A further object of the invention is to provide a bearing for a mill or calender roll such that, when the bearing is flood lubricated, the lubricant will be drained from the bearing prior to reaching the face of the roll shoulder.

Still another object of the invention is to provide a bearing for a roll of a mill, calender or the like, which bearing is provided with an oil seal, and which is so constructed that the greater part of the bearing lubricant will be drained therefrom, after being used, prior to its coming into contact with the oil seal, so that the latter may retain the oil which does reach it and prevent any leakage thereby.

To these and other ends the invention consists in the novel features and combinations of parts to be hereinafter described and claimed.

In the accompanying drawings:

Fig. 3 is an enlarged view, similar to Fig. 1, of the parts adjacent the oil-drainage means; and Fig. 4 is a face view of an annular ring employed in the construction.

Figure 1:
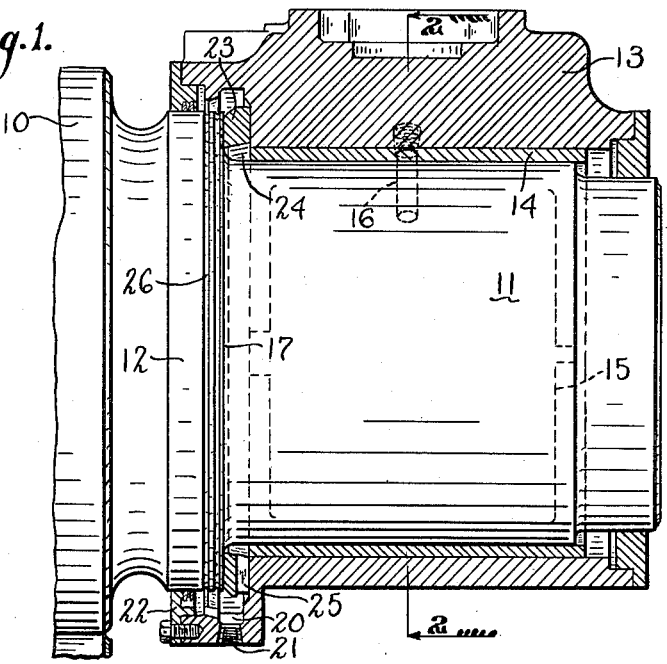
Fig. 1 is a sectional view of the bearing of a mill roll embodying my improvements.

To illustrate a preferred embodiment of my invention, I have shown a roll 10, such as a mill roll, for example, which roll is provided with a bearing neck 11 and a reduced or shoulder portion 12 between the bearing neck and the body or working part of the roll. The bearing neck is shown as supported in a journal box 13, this box being provided with a cylindrical bearing ring or liner 14 surrounding the bearing neck 11.

Figure 2:
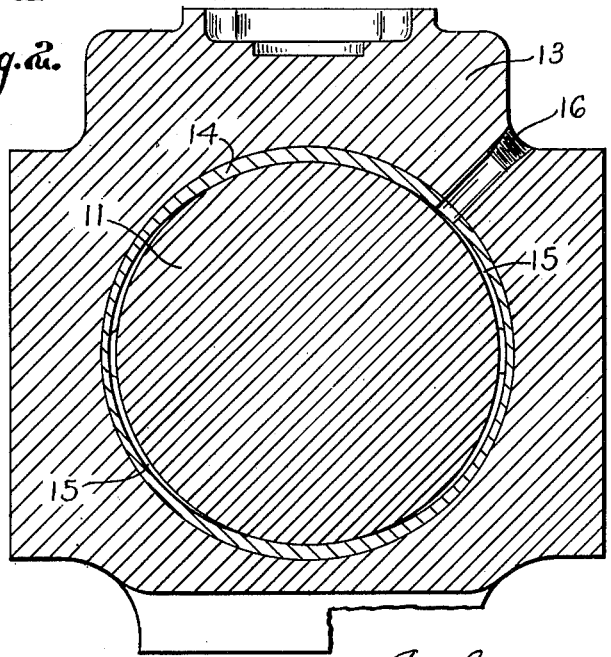
Fig. 2 is a transverse sectional view on line 2—2 of Fig. 1.

As shown in Fig. 2 of the drawings, this bearing ring may be relieved internally, as shown at 15, so as to permit the spreading of the lubricant over the bearing neck 11, the lubricant being introduced into the space between the liner and the roll neck through the inlet opening 16. It will be understood that a considerable supply of oil, really an excess supply, is conducted to the bearing, and the excess is drained off and used again.

In the usual construction, the bearing ring 14 is provided with an outwardly extending flange at its inner end, which flange abuts the face 17 of the roll shoulder, and the lubricant drains off between the face of this flange and the face 17 of the roll shoulder into a well or sump 20 from which it is removed or drained off through the opening 21. Some type of oil-sealing means 22 is usually provided between the roll shoulder and the bearing to prevent leakage of oil along the surface of the roll. However, as an excess of oil is supplied to the bearing, this oil tends to follow along the roll shoulder to this oil seal, and it has been found very difficult to provide sealing means which will effectively contain the oil and prevent leakage.

In the present instance an annular ring 23 is provided between the face of the journal box 13 and the face 17 of the roll shoulder, the liner 14 being discontinued at a point flush with this end of the journal box, this construction providing an annular space 24 within which the oil may collect.

The ring 23 is provided with a cut-out portion or opening 25, shown more especially in Figs. 3 and 4, which permits the collected oil to drain from the well 24 into the sump 20, the oil draining from the ring 23, at the outside face thereof, without contacting the face 17 of the revolving roll shoulder. It will, of course, be understood that one or more openings 25 will be provided as necessary to take care of the quantity of oil supplied to the bearing.

As is usual, the roll shoulder is provided with one or more grooves 26, which tend to prevent the oil from following along the shoulder of the roll, and these grooves will take care of any small quantity of oil that does pass by the ring 23. The seal 22, therefore, has very little work to do, and will adequately perform this work and easily turn back and retain any oil which reaches the seal.

While as illustrated the ring 23 is a separate part, it may be formed integrally as a flange upon the liner 14, and openings provided in this flange to permit the drainage of the oil from the outside face thereof, or the face thereof remote from the face 17 of the roll shoulder. As illustrated, the ring 23 is secured to the face of the journal box by screws 27, and fits snugly between the roll shoulder and the adjacent end of the journal box.

The lubricant, which is introduced into the bearing through the opening 16, spreads out around the roll neck 11 through the relief spaces 15, and, after its lubricating function is performed, enters the space 24 about the inner end of the roll neck and between the latter and the annular ring 23. The oil, therefore, collects in this space, and is permitted to drain out through the opening 25 in this ring, into the sump 20 and the outlet 21. Thus it is seen that the oil is permitted to drain from the bearing before it reaches the shoulder 12, and therefore a very small part of the lubricant passes out between this shoulder and the ring 23. The grooves 26 further tend to prevent such oil as does pass the ring 23 from following the roll shoulder to the sealing rings 22. As a very small quantity of the oil reaches the sealing rings, they will serve to effectively prevent leakage from the bearing.

While I have shown and described a preferred embodiment of my invention, it will be understood that it is not to be limited to all of the details shown, but is capable of modification and variation within the spirit of the invention and within the scope of the claims.

What I claim is:

1. A bearing structure for a mill roll or the like having a bearing neck and a shoulder adjacent the neck, a journal box in which the neck is rotatably mounted, a bearing liner in said box, said liner terminating in a plane spaced from that of the face of said shoulder, oil-inlet means in the box and extending through said liner, a ring positioned between the face of the shoulder and the inner face of said box to engage both said faces, said liner terminating at the outer face of said ring to provide a space between said ring and the roll neck, and means providing a drain opening for said space to drain off the oil trapped by said ring before it reaches the roll shoulder.

2. A bearing structure for a mill roll or the like, said roll having a bearing neck and a shoulder adjacent the neck, a journal box in which said neck is rotatably mounted, a bearing liner in said box having its inner edge substantially flush with that face of the journal box adjacent the shoulder on the roll, and a ring member secured to said face of the journal box against which member the roll shoulder engages, said ring member being spaced from the inner edge of the liner to provide an oil space between said member and the roll neck to receive excess oil, and said journal box being provided with an oil sump in communication with said space.

3. A bearing structure for a mill roll or the like, said roll having a bearing neck and a shoulder adjacent the neck, a journal box in which said neck is rotatably mounted, a bearing liner in said box, the inner edge of which terminates in a plane spaced from the face of the shoulder, a ring surrounding and spaced from said roll neck, said ring on one side thereof bearing against said roll shoulder and on the other side thereof bearing against the adjacent face of the journal box and said ring and the adjacent edge of the liner providing between them an annular oil space to receive excess oil, and means providing a drain opening for said space to drain off the oil trapped by said ring before it reaches the roll shoulder.

ARTHUR W. KEMP.

REFERENCES CITED

The following references are of record in the file of this patent:

UNITED STATES PATENTS

| Number | Name | Date |
|---|---|---|
| 2,409,874 | Lessmann | Oct. 22, 1946 |